United States Patent
Hara

(10) Patent No.: US 8,817,114 B2
(45) Date of Patent: *Aug. 26, 2014

(54) IMAGE CAPTURE APPARATUS

(71) Applicant: Canon Kabushiki Kaisha, Tokyo (JP)

(72) Inventor: Kenichiroh Hara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/686,313

(22) Filed: Nov. 27, 2012

(65) Prior Publication Data

US 2013/0100298 A1  Apr. 25, 2013

Related U.S. Application Data

(63) Continuation of application No. 11/470,729, filed on Sep. 7, 2006, now Pat. No. 8,339,465.

(30) Foreign Application Priority Data

Sep. 9, 2005  (JP) .................................. 2005-263072

(51) Int. Cl.
*H04N 5/225* (2006.01)

(52) U.S. Cl.
USPC ....................................................... 348/207.1

(58) Field of Classification Search
USPC ................. 348/207.1, 207.11, 207.2, 207.99, 348/211.1, 211.14, 211.2, 211.3, 211.6, 348/211.8, 211.9, 211.99, 220.1, 231.9

See application file for complete search history.

(56) References Cited

U.S. PATENT DOCUMENTS

| | | | | |
|---|---|---|---|---|
| 6,104,430 | A * | 8/2000 | Fukuoka | 348/231.6 |
| 6,886,056 | B2 * | 4/2005 | Ohmura | 710/62 |
| 7,265,787 | B2 | 9/2007 | Takane | |
| 7,538,792 | B2 * | 5/2009 | Takahashi | 348/207.1 |
| 8,339,465 | B2 * | 12/2012 | Hara | 348/207.1 |
| 2003/0223007 | A1 | 12/2003 | Takane | |
| 2004/0090543 | A1 * | 5/2004 | Suehiro | 348/231.99 |
| 2005/0174460 | A1 * | 8/2005 | Aizawa | 348/333.01 |

FOREIGN PATENT DOCUMENTS

| | | |
|---|---|---|
| JP | 2001-275016 A | 10/2001 |
| JP | 2003-078798 A | 3/2003 |
| JP | 2003-092694 A | 3/2003 |

* cited by examiner

*Primary Examiner* — Lin Ye
*Assistant Examiner* — Chriss Yoder, III
(74) *Attorney, Agent, or Firm* — Cowan, Liebowitz & Latman, P.C.

(57) ABSTRACT

In the presence of a switching instruction of operation modes in an image capture apparatus, it is examined whether image data is being transferred or not. When the image data is not being transferred, the operation modes are immediately switched. When the image data is being transferred, the operation modes are switched after the completion of transfer.

22 Claims, 9 Drawing Sheets

IMAGE CAPTURE APPARATUS

CROSS-REFERENCE TO RELATED APPLICATIONS

This application is a continuation of application Ser. No. 11/470,729, filed Sep. 7, 2006 the entire disclosure of which is hereby incorporated by reference.

BACKGROUND OF THE INVENTION

1. Field of the Invention

The present invention relates to an image capture apparatus such as a digital camera and a method of controlling the same.

2. Description of the Related Art

As an image capture apparatus such as a digital camera capable of outputting image data as electronic data, an image capture apparatus is known which can transfer image data to an external device (Japanese Patent Laid-Open No. 2000-137796). Further, it is known that image data is transferred in parallel with writing to a storage medium during shooting operations, and that image data, selected from a plurality of image data having been written in the storage medium, is transferred.

The former is a transfer process in operations of shooting mode, and the latter is a transfer process in operations of playback mode.

For example, it may be necessary to transfer a previously shot image to an external device immediately after successively shooting in which a large number of images have been shot in shooting mode, or a photo opportunity may suddenly come up during transfer of an image in playback mode. In this case, the user may immediately switch his/her camera to the shooting mode.

However, the conventional image capture apparatuses are not designed for a situation in which operation modes are switched by the user before the transfer process is completed. Such mode switching may cause an abnormal termination of the transfer process.

Further, in the conventional image capture apparatuses, an image transfer process in shooting mode and an image playback process in playback mode are different from each other. Thus an external device at the transfer destination, typically a computer, is required different internal processing according to an operation mode of the image capture apparatus. As stated, switching of operation modes in the image capture apparatus cannot be handled only in the image capture apparatus.

SUMMARY OF THE INVENTION

The present invention is directed to overcome the above-described drawbacks and disadvantages. For example, the present invention is to provide a useful image capture apparatus which is capable of addressing a switching of operation modes during a transfer process.

According to the present invention, the foregoing object is attained by providing an image capture apparatus having a first operation mode and a second operation mode, the image capture apparatus being capable of transferring image data to an external device in the first and second operation modes, the image capture apparatus comprising:

a communication unit adapted to communicate with the external device, a detection unit adapted to detect a switching instruction to the first and second operation modes, and a switching control unit adapted to switch, in one of the first and second operation modes, to the other operation mode after completion of transfer performed by the communication unit, the operation modes being switched when the detection unit detects a switching instruction to the other operation mode of the first and second operation modes while the communication unit transfers the image data to the external device.

According to another aspect of the present invention, the foregoing object is attained by providing an image capture apparatus having a first operation mode and a second operation mode, the image capture apparatus being capable of transferring image data to an external device in the first and second operation modes, the image capture apparatus comprising:

a communication unit adapted to communicate with the external device and transfer the image data to the external device in the same procedures regardless of whether the image capture apparatus operates in the first operation mode or the second operation mode and wherein the communication unit being capable of performing the transfer as a background process;

a detection unit adapted to detect a switching instruction to the first and second operation modes, and a switching control unit adapted to switch from one of the first and second operation modes to the other operation mode, while controlling the communication unit to perform the transfer as a background process, in case where the detection units detects a switching instruction to the other operation mode of the first and second operation modes during the communication unit transfers the image data to the external device.

Further features and aspects of the present invention will become apparent from the following description of exemplary embodiments with reference to the attached drawings.

DESCRIPTION OF THE EMBODIMENTS

Exemplary embodiments, features and aspects of the present invention will now be described in detail below with reference to the attached drawings.

First Exemplary Embodiment

Figure 1:
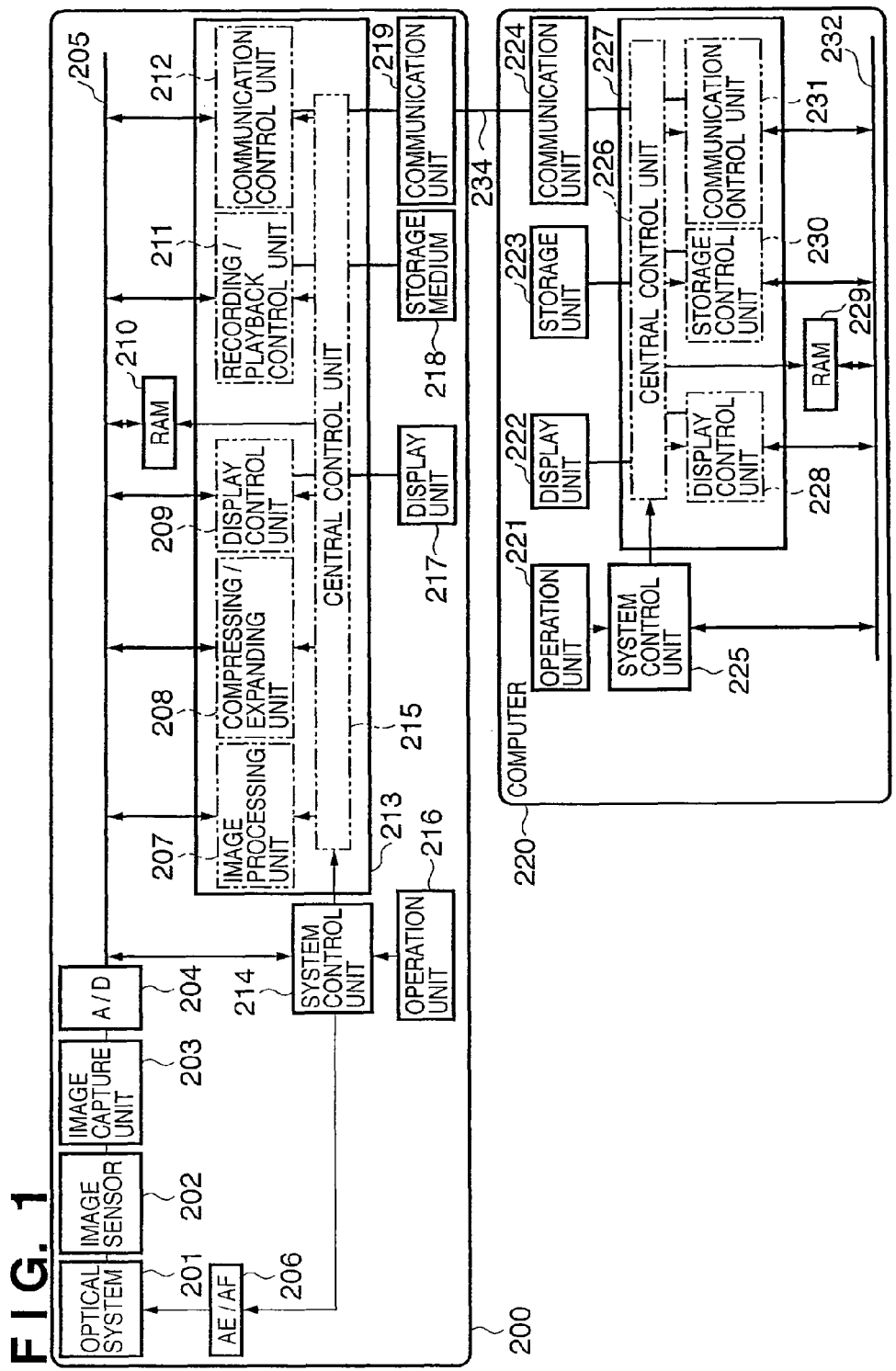
FIG. 1 is a diagram showing that a digital camera 200 and a PC 220 of First Embodiment of the present invention are connected to each other via a communication interface.

FIG. 1 is a diagram showing an example of the configuration of an image capture system according to the First Embodiment of the present invention. In FIG. 1, a digital camera 200 is an image capture apparatus of the present embodiment and a PC (personal computer) 220 is a computer of the present embodiment. In the present embodiment, images are transferred between the digital camera 200 and the PC 220 through PTP (Picture Transfer Protocol). The digital camera 200 of the present embodiment can transfer image data both in shooting mode and playback mode. Moreover, the digital camera 200 of the present embodiment can be replaced with a digital video camera or any apparatus can operate as a digital camera, such as a cellular phone with a built-in digital camera. In the present embodiment, a digital camera and an apparatus operating as a digital camera will be referred to as an image capture apparatus.

The configuration of the digital camera 200 will be discussed below. A light flux from a subject passes through an optical system 201 including a lens and an aperture diaphragm. Then, the light flux forms an image in an image sensor 202 and is stored therein as electric charge. The electric charge stored in the image sensor 202 is converted to an analog image signal in an image capture unit 203. The analog image signal outputted from the image capture unit 203 is converted to digital image data in an AD converter 204 and stored in RAM (random access memory) 210 through a data bus 205. A CCD image sensor, a CMOS image sensor, and so on may be used as the image sensor 202.

In a central processing unit 213, an image processing unit 207 performs image processing such as white balance, sharpness, blurring, color balance, and level correction on a digital image signal stored in the RAM 210. A compressing/expanding unit 208 has the function of compressing, according to a predetermined image compressing method, a digital image having been processed in the image processing unit 207 and the function of expanding a digital image having been compressed according to the predetermined image compressing method. An image compressing method defined by JPEG, JPEG 2000, and so on may be used as the predetermined image compressing method. The image compression ratio of a digital image can be selected by the user. A display control unit 209 displays a user interface (UI) screen such as a menu screen on a display unit 217.

A recording/playback control unit 211 controls input and output to and from a storage medium 218 such as a memory card. A communication control unit 212 controls data input/output to and from a communication unit 219. A central control unit 215 is, for example, a CPU (central processing unit) which runs a control program stored in ROM (not shown) to control the units of the digital camera 200, so that functions discussed later are achieved.

A system control unit 214 is connected to the data bus 205 and controls an input operation performed by the user through an operation unit 216. The display unit 217 is, for example, an LCD (liquid crystal display), an organic EL (electroluminescence) display, and so on. The display unit 217 displays a display result of the display control unit 209. The image data (for example, JPEG image data or the like after compression and encoding) having been stored in the RAM 210 is stored in the storage medium 218 through the recording/playback control unit 211. The storage medium 218 may be detachable from the digital camera 200 or included in the digital camera 200. The storage medium 218 can keep the data even when the digital camera is not turned on. When the storage medium 218 is a detachable storage medium, a CompactFlash (registered trademark) memory card, an SD memory card, and so on may be used.

The communication unit 219 has at least a wireless communication function. In the absence of wired communication function, information necessary for wireless communications is obtained and updated through the storage medium 218. In the presence of the wired communication function, information necessary for wireless communications is obtained and updated from a device connected via a wire. The communication unit 219 may be detachable or may not be detachable. In the present embodiment, the communication control unit 212 can carry out communications based on PTP.

The configuration of the PC 220 will be discussed below.

An operation unit 221 is an input device such as a keyboard and a mouse. In a system control unit 225, an operation is detected and control is performed based on an operation result. A display unit 222 is a CRT, an LCD, and so on. The display unit 222 displays an image, for example, a user interface screen having been indicated by a display control unit 228. RAM 229 is volatile memory which is expanded during the execution of the OS (operating system) of the computer and an application (including an OS) for communications through PTP.

A storage unit 223 is a device for input/output responding to a request for data from a storage control unit 230. The storage unit 223 is a nonvolatile storage device such as a hard disk drive (HDD). In the storage unit 223, the OS of the computer and an application (including an OS) for communications through PTP are stored. The storage unit 223 may include a removable medium drive such as a memory card reader and a flexible disk drive.

A communication unit 224 is a communication device connectable to a communication interface 234. The communication unit 224 inputs and outputs data through a communication control unit 231. The communication unit 224 has at least a wireless communication function. In the absence of a wired communication function, information necessary for wireless communications is obtained and updated through a storage medium such as a removable medium and USB memory. In the presence of the wired communication function, information necessary for wireless communications is obtained and updated from a device connected via a wire. The communication unit 224 may be detachable or may not be detachable.

A central processing unit 227 is made up of the display control unit 228, the storage control unit 230, the communication control unit 231, and a central control unit 226. The central control unit 226 is, for example, a CPU which runs a control program stored in the storage unit 223 to control the units of the PC 220, so that functions discussed later are achieved. A data bus 232 is connected to the system control unit 225, the display control unit 228, the RAM 229, the storage control unit 230, and the communication control unit 231.

Figure 2:
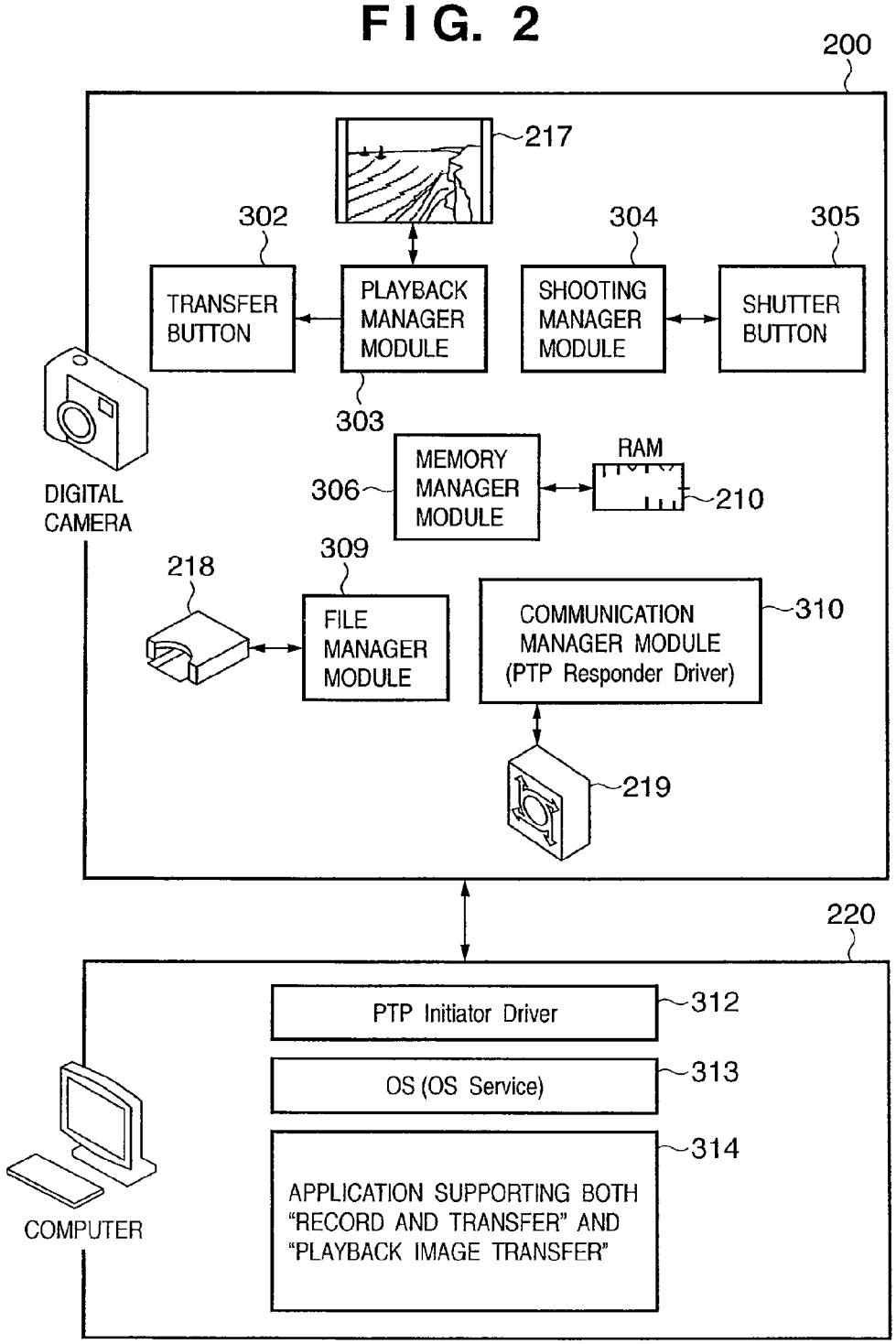
FIG. 2 is a diagram for explaining operations performed when the digital camera 200 of the embodiment of the present invention is connected to the PC 220 through PTP to perform "record and transfer" or "playback image transfer"

FIG. 2 is a diagram for explaining operations performed when the digital camera 200 of the present embodiment is connected to the PC 220 through PTP to implement "record and transfer" or "playback image transfer". In FIG. 2, in order to make the operations of the digital camera 200 easy to understand, main functions implemented using the constituent elements of FIG. 1 are illustrated as function modules, and processing will be discussed as the operations of the function modules. The function module is actually a part of the control program (OS, driver, and application) of the digital camera 200 and is implemented by the central control unit 215 which runs the control program to control the units.

The display unit 217 provides kinds of display according to a playback manager module 303. A transfer button 302 corresponds to one of buttons included in the operation unit 216 and can notify the playback manager module of a transfer request. A shutter button 305 corresponds to one of buttons included in the operation unit 216 and can notify a shooting manager module 304 of a request for shooting and a request for transfer of a shot image. Data communications are possible between the function modules.

The RAM 210 is managed by a memory manager module 306. The storage medium 218 is managed by a file manager module 309. The communication unit 219 is managed by a communication manager module 310. The communication manager module includes PTP Responder Driver for implementing a function as a responder in PTP, and PTP communications can be carried out through the communication unit 219 with PTP Initiator Driver present in the PC 220.

The PC 220 connected to the digital camera 200 can transmit a request for an image to the digital camera 200 in response to a request for transfer of an image from the digital camera 200, and obtain the image. This processing will be discussed later in accordance with FIG. 3.

PTP Initiator Driver 312 is a driver on the initiator side of PTP. PTP Initiator Driver 312 can exchange data with an OS (OS Service) 313. The OS (OS service) 313 can exchange data with an application 314 which supports both "record and transfer" and "playback image transfer".

Figure 3:
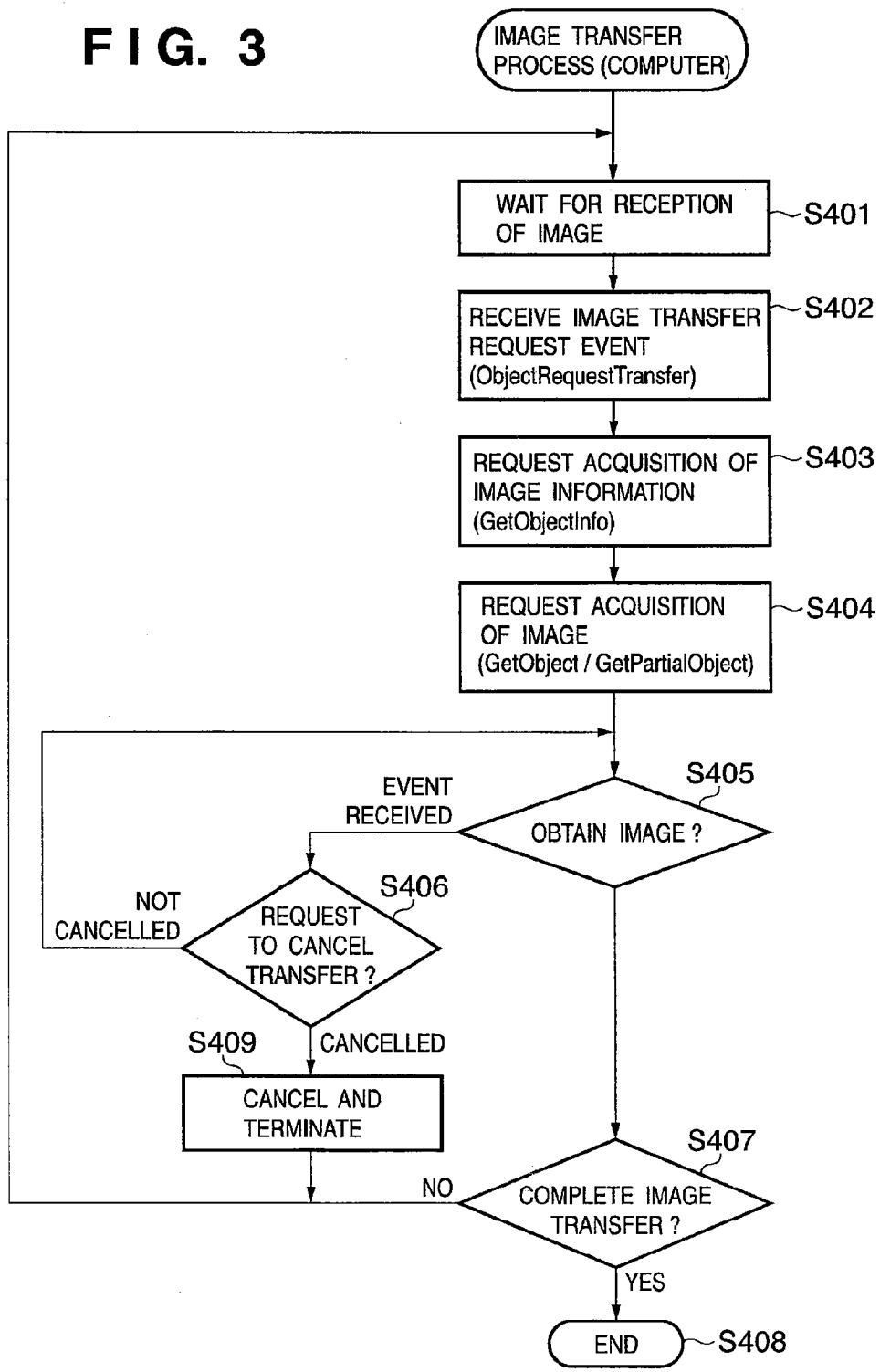
FIG. 3 is a flowchart showing processing of the PC 220 when an image is transferred from the digital camera 200 to the PC 220 according to an embodiment of the present invention.

FIG. 3 is a flowchart showing processing in the PC 220 when an image is transferred from the digital camera 200 to the PC 220.

The processing of FIG. 3 is implemented by the central control unit 226 which launches and executes the application 314, for example, when it is detected that the digital camera 200 is connected to the communication unit 224 of the PC 220 through the communication interface 234. The application 314 supports both "record and transfer" and "playback image transfer" from the digital camera 200.

The "record and transfer" is processing for immediately transferring a shot image to the PC 220 when the digital camera 200 operates in shooting mode. The "playback image transfer" is processing for transferring, when the digital camera 200 operates in playback mode, one or more images stored in the storage medium 218 to the PC 220 in response to an instruction through the transfer button or the like.

In the following explanation, communications from the PC 220 to the digital camera 200 are carried out through the application 314→the OS 313→PTP Initiator Driver 312→the communication unit 219→PTP Responder Driver 310→(other function modules). Communications from the digital camera 200 to the PC 220 are carried out in the reverse order.

The PC 220 waits for reception of an image in response to a request for connection from the digital camera 200 (S401). At the transfer of an image, the digital camera 200 of the present embodiment transmits, as will be described later, a request for transfer of an image to the PC 220 both in "record and transfer" and in "playback image transfer". In the present embodiment, ObjectRequestTransfer event in PTP is transmitted as a request for transfer of an image. ObjectRequestTransfer event includes ObjectHandle which is information for identifying an object (in this case, a shot image) to be transferred from the digital camera 200.

When receiving the request for transfer of an image while waiting for reception of an image (S402), the PC 220 transmits a request for acquisition of image information to the digital camera 200 (S403). In the present embodiment, based on ObjectHandle included in ObjectRequestTransfer event, GetObjectInfo command in PTP is transmitted as a request for acquisition of image information.

In response to the request, the digital camera 200 (the file manager module 309 and the communication manager module 310) returns information about the shot image in the format of ObjectInfo Dataset. The returned information includes a data format (ObjectFormat), a compressed size (ObjectCompressedSize), the size of a thumbnail and the image data, a file name, and a parent object (for example, ObjectHandle of a parent directory).

The PC 220 decides whether writing to the storage unit 223 is possible or not based on the information obtained in S403. Then, in S404, the PC 220 requests acquisition of an image. In the present embodiment, GetObject and GetPartialObject command in PTP are transmitted as a request for acquisition of an image. ObjectHandle received from the digital camera 200 in S401 is designated in this command, so that an object to be read (in this case, a shot image) is designated.

In response to the request for acquisition of an image, shot image data is transferred from the digital camera 200. The PC 220 monitors, during the acquisition of an image, the presence or absence of a notification of a transfer cancel event (for example, CancelTransaction) from the digital camera 200 (S406). In the absence of a notification of the transfer cancel event, the image acquisition of S405 is continued. In the presence of a notification of the transfer cancel event during the acquisition of an image, the acquisition is cancelled and terminated (S409) and the PC 220 returns to the standby state to wait for the reception of an image (S401). When the image transfer is completed without the reception of the cancel event (S407), the PC 220 returns to the standby state to wait for the reception of an image. When logical communications with the digital camera 200 are discontinued or the application 314 supporting both "record and transfer" and "playback image transfer" is terminated, the processing is completed (S408).

Figure 4:
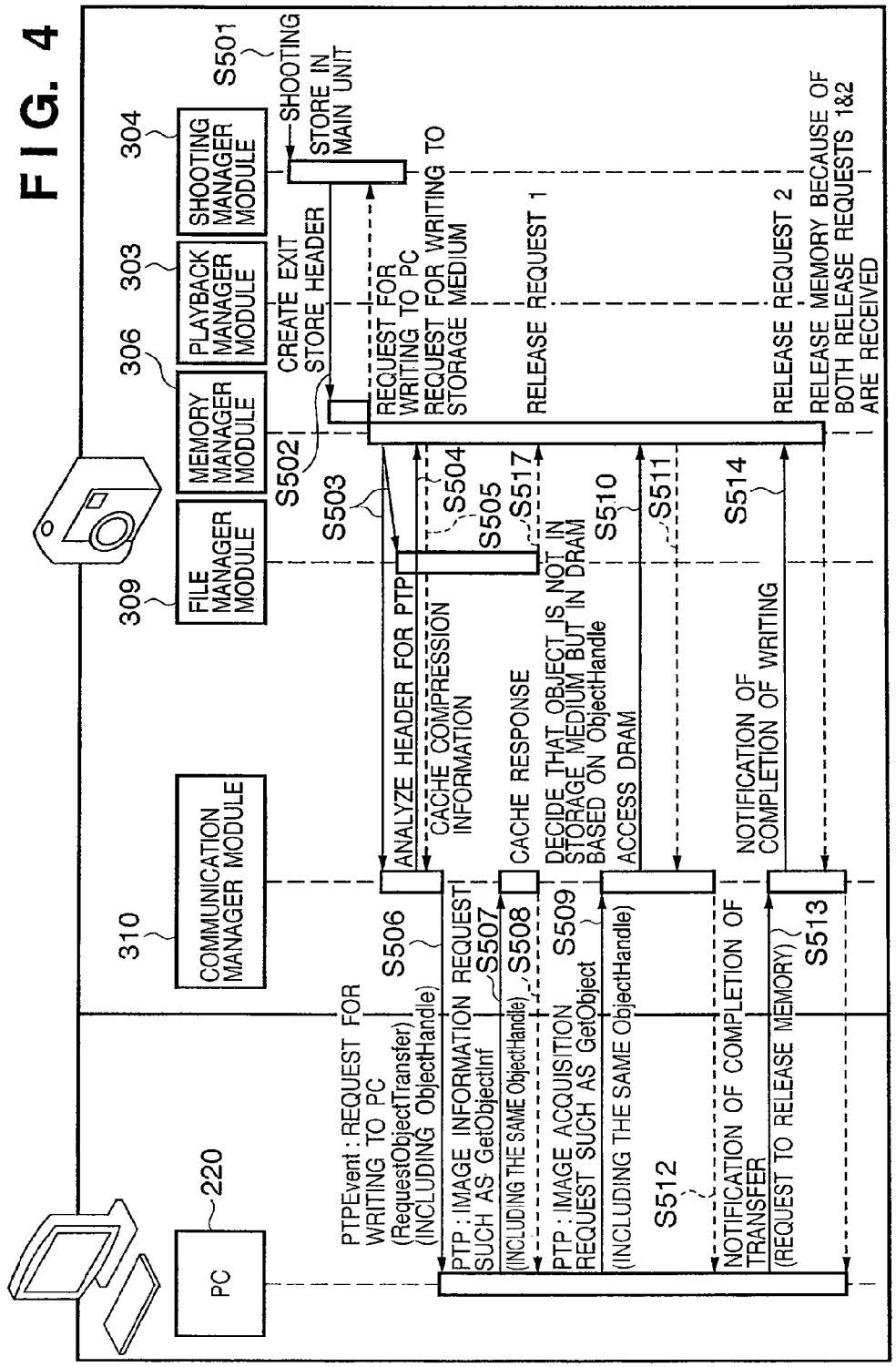
FIG. 4 is a sequence diagram showing mutual operations during the "record and transfer" of the digital camera 200 and the PC 220 of an embodiment of the present invention.
Figure 5:
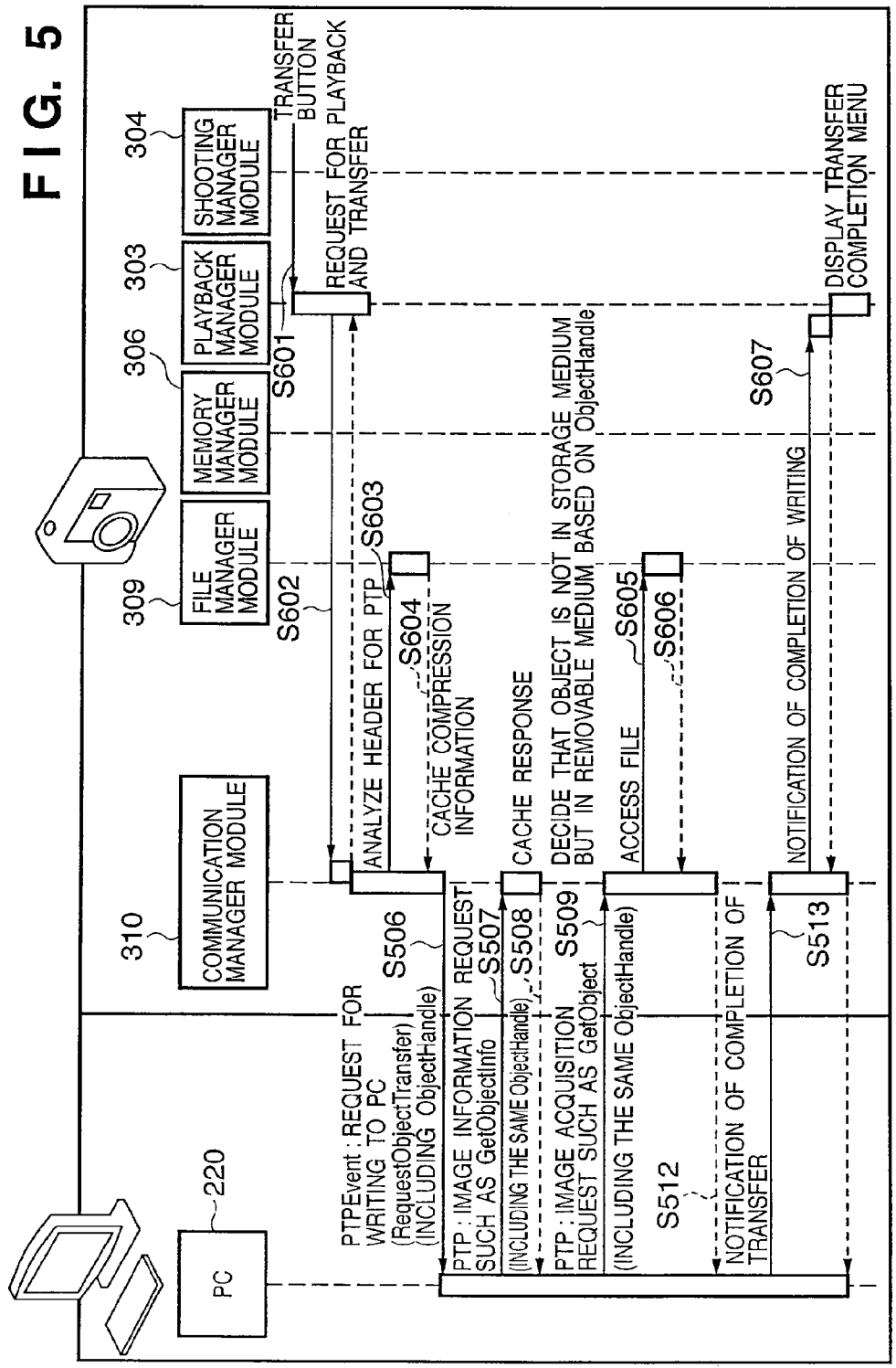
FIG. 5 is a sequence diagram showing mutual operations during the "playback image transfer" of the digital camera 200 and the PC 220 of an embodiment of the present invention.

Referring to FIGS. 4 and 5, the following will discuss the processing of the digital camera 200 and the processing of the PC 220 during "record and transfer" and "playback image transfer". The following will clarify that the detail of the processing of the digital camera 200 and the processing of the PC 220 are shared in "record and transfer" and "playback image transfer".

FIGS. 4 and 5 are sequence diagrams showing the mutual operations of the digital camera 200 and the PC 220 according to the present embodiment. FIG. 4 shows the operations of "record and transfer" and FIG. 5 shows the operations of "playback image transfer".

As is evident from a comparison between FIGS. 4 and 5, the same steps or procedures are performed in the PC 220 during "record and transfer" and "playback image transfer".

Therefore, regarding an application program running on the PC 220, it is not necessary to take the operation mode of the digital camera 200 into consideration for the transfer of an image. In other words, even when the operation unit 216 of the digital camera 200 is operated to switch playback mode and shooting mode, an image can be obtained in the same steps.

For an application which requires the identification of the operation mode of the digital camera 200, the operation mode of the digital camera 200 may be obtained. Such an application includes an application which requires a change of behavior in response to processing other than image transfer according to the operation mode of the digital camera 200. The application inquires about the state of the digital camera 200 (for example, by means of GetDeviceInfo command), so that the operation mode can be obtained. Alternatively, the digital camera 200 may notify the PC 220 of the state of the digital camera 200 (for example, as an event) after the operation mode is switched or when the operation mode is switched. In either of the methods the PC 220 and the application program running on the PC 220 can be notified of the operation mode of the digital camera 200 and the switching of the operation modes.

(Image Transfer—"Record and Transfer")

FIG. 4 shows an example of the steps of "record and transfer". When the shutter button 305 (FIG. 2) included in the operation unit 221 (FIG. 1) is fully pressed to provide a shooting instruction in the digital camera 200 operating in shooting mode, the instruction is recorded in the storage medium 218 and transferred to the PC 220.

In response to the shooting instruction (S501), the shooting manager module 304 performs shooting according to various settings to generate shot image data (for example, an image data file in JPEG format). Then, the shot image data and additional information (for example, a header) are generated in the RAM 210 through the memory manager module 306 (S502).

The memory manager module 306 generates a shot image file based on the shot image data and the additional information and requests the file manager module 309 to write the file into the storage medium 218. Further, the memory manager module 306 requests the communication manager module 310 to transfer the file to the PC 220 (S503).

After writing into the storage medium 218, the file manager module 309 requests the memory manager module 306 to release the memory (S517).

The communication manager module 310 performs, when receiving the transfer request from the memory manager module 306, processing for transmitting according to PTP an image file to be transferred, that is, processing for handling an image file as PTP-Object.

Specifically, the communication manager module 310 analyzes image data to be transferred on the RAM 210 or detects the presence of real data on the memory (S504) and obtains information about the image data (information which includes the size and is transmitted by ObjectInfo dataset) (S505). Then, the communication manager module 310 allocates ObjectHandle (information for identifying image data to be transferred) and caches allocated ObjectHandle and information about the image data.

After that, the communication manager module 310 issues a request for image transfer (RequestObjectTransfer event acting as a PTP event) to the PC 220. The request for image transfer includes ObjectHandle as information for enabling the PC 220 to identify an image.

When receiving the image transfer request, the PC 220 issues, to the communication manager module 310 of the digital camera 200, GetObject command including ObjectHandle included in RequestObjectTransfer event and requests information about image data to be transferred (S507).

In response to the request for information, the communication manager module 310 notifies the PC 220 of the cached image information (for example, by ObjectInfordataset) (S508). The PC 220 having obtained the image information subsequently transmits a command such as GetObject to request acquisition of the image information (S509). Also in GetObject command, ObjectHandle included in RequestObjectTransfer event is used to designate image data to be requested for transfer.

The communication manager module 310 detects based on ObjectHandle designated in GetObject command that the image data is present on the RAM 210. In PTP, information such as StorageID and ParentObject is managed for each object, and thus the location of each object can be detected based on ObjectHandle. Then, the communication manager module 310 accesses the RAM 210 (S510), reads the image data (S511), and transfers the data to the PC 220 (S512).

After the completion of transfer, the PC 220 requests the communication manager module 310 to release the memory (S513). The communication manager module notifies the memory manager module 306 of the received request for the releasing of the memory (S513). The memory manager module has already received the request for the releasing of the memory from the file manager module 309 (S517). However, the memory manager module does not release the area of shot image data in the RAM 210 before obtaining the request to release the memory from the communication manager module 310. Since two requests for the releasing of the memory are received in S514, the area where the shot image data is present is released at that point.

FIG. 4 illustrates the sequence of a single shot. In the case of continuous shooting, the same steps are performed on each shot image. Processing on shot images may be performed sequentially or performed in a plurality of threads. However, the same transfer steps are performed on each image.

(Image Transfer—"Playback Image Transfer")

FIG. 5 shows an example of the steps of "playback image transfer". If the transfer button 302 (FIG. 2) included in the operation unit 221 (FIG. 1) is pressed when the digital camera 200 operating in playback mode, a transfer instruction is provided and one or more playback images previously selected by the user is transferred to the PC 220. In FIG. 5, the same processing as FIG. 4 is indicated by the same reference numeral.

When receiving the press of the transfer button 302 (S601), the playback manager module 303 issues a transfer request to the communication manager module 310 (S602). The communication manager module 310 prepares for transmission of image data through PTP communications. Specifically, the communication manager module 310 allocates ObjectHandle to the image data and requests the file manager module 309 to obtain information about a designated image (S603). Then, the communication manager module 310 analyzes the data of the obtained image information or sets a transfer flag for the image and caches the image information (S604).

After that, the communication manager module 310 issues RequestObjectTransfer acting as a PTP event to the PC 220 (S506). The PC 220 issues GetObjectInfo command as a request for the acquisition of image information to the communication manager module 310 by using ObjectHandle in received RequestObjectTransfer event S507). The communication manager module 310, when the image information is not found, may analyze the image information at this point. In this case, the image information has been already cached in S604 and the communication manager module 310 responds to the PC 220 by means of the cached image information (S508).

After the acquisition of the image information, the PC 220 requests the acquisition of image data by issuing GetObject command or the like (S509). The communication manager module 310 detects that the image data is present in the storage medium 218 in response to the request for the acquisition of the image data, in this case, based on information (ObjectHandle) for identifying an image in GetObject command.

Then, the communication manager module 310 requests the file manager module 309 to read a designated image data file (S605). The file manager module 309 reads the designated image file from the storage medium 218 and outputs the image file to the communication manager module 310 (S606). The communication manager module 310 transfers to the PC 220 the image data having been received from the file manager module 309 (S512).

After the transfer of the data, the PC 220 notifies the communication manager module 310 of the completion of transfer (S513). The communication manager module 310 notifies, in response to the notification of the completion of transfer, the playback manager module 303 of a message about the completion of transfer (S607). The communication manager module 310 may notify, immediately after the completion of transfer, the playback manager module 303 of the message about the completion of transfer without waiting for the notification from the PC 220.

For example, when two or more playback images are selected by the user in playback mode, the transfer steps of FIG. 5 are repeated according to the number of selected images. As in the "record and transfer" process, the processing of FIG. 5 can be performed sequentially or performed in a plurality of threads. In either case, the transfer steps are performed on images as shown in FIG. 5.

(Switching of Modes During Image Transfer)

Figure 6:
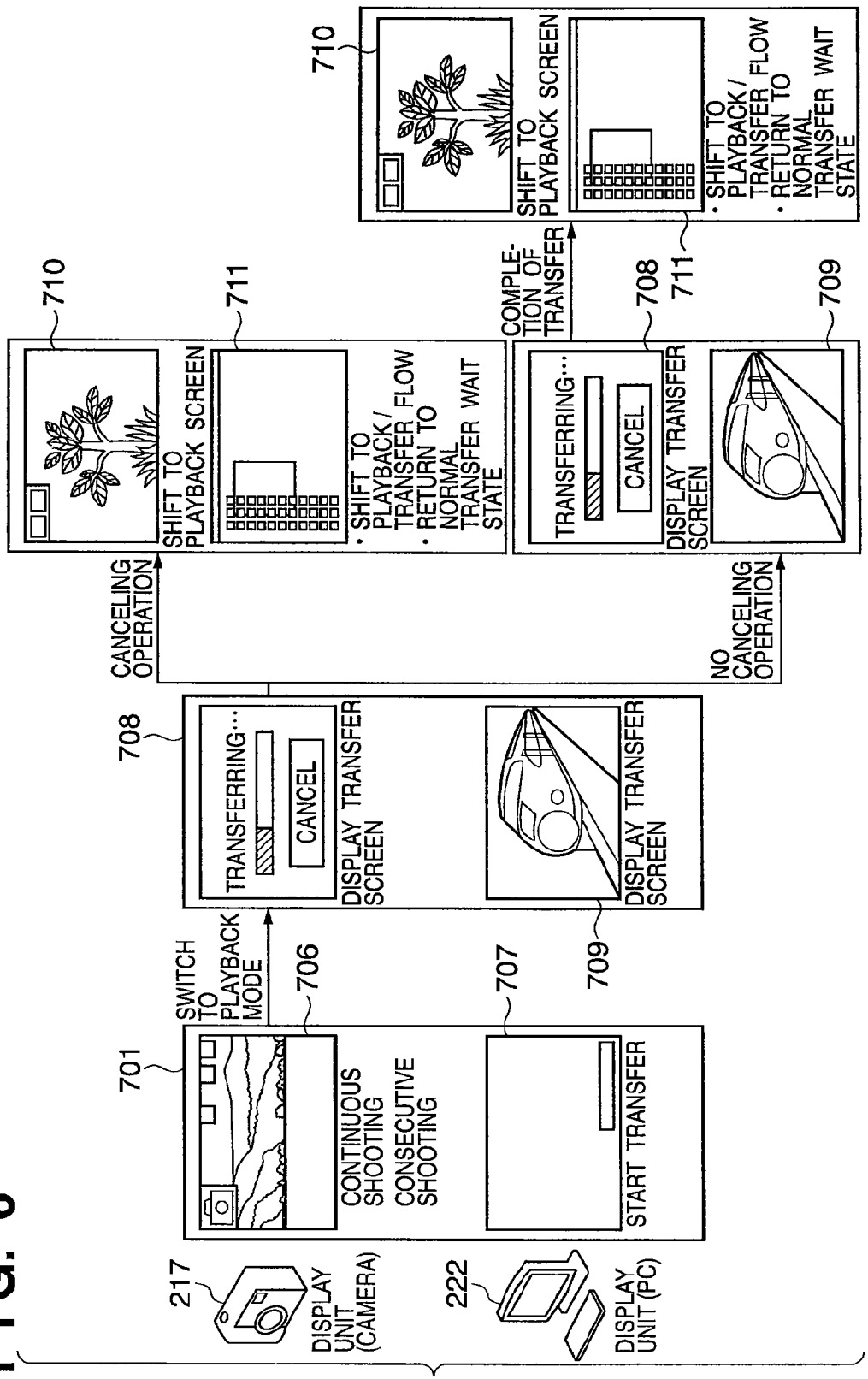
FIG. 6 is a diagram showing a change of display on the digital camera 200 and the PC 220 when a switching instruction of operation modes is provided in the digital camera 200 during "record and transfer" according to the First Embodiment.
Figure 7:
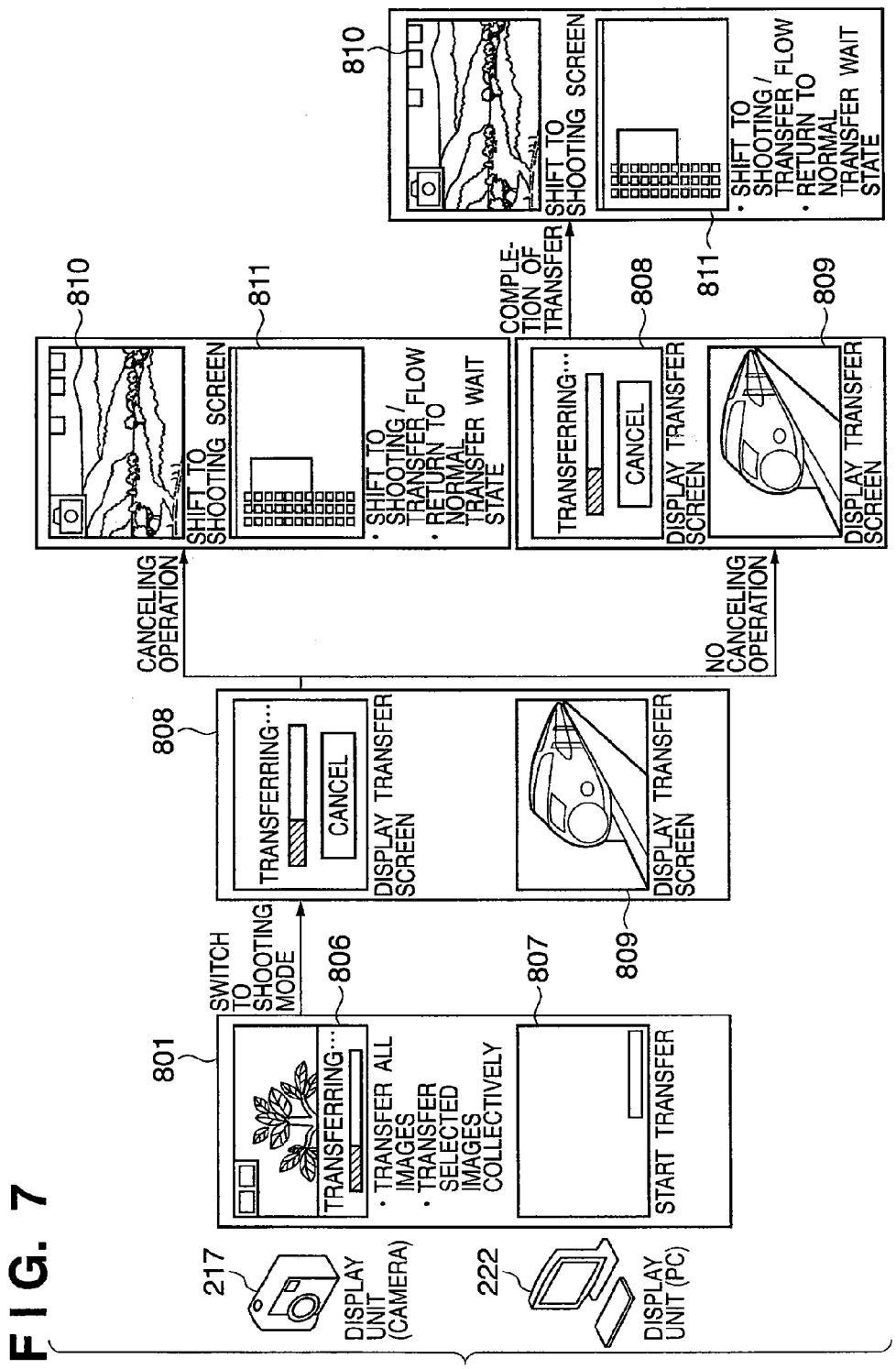
FIG. 7 is a diagram showing a change of display on the digital camera 200 and the PC 220 when a switching instruction of operation modes is provided in the digital camera 200 during "playback image transfer" according to the First Embodiment.
Figure 9:
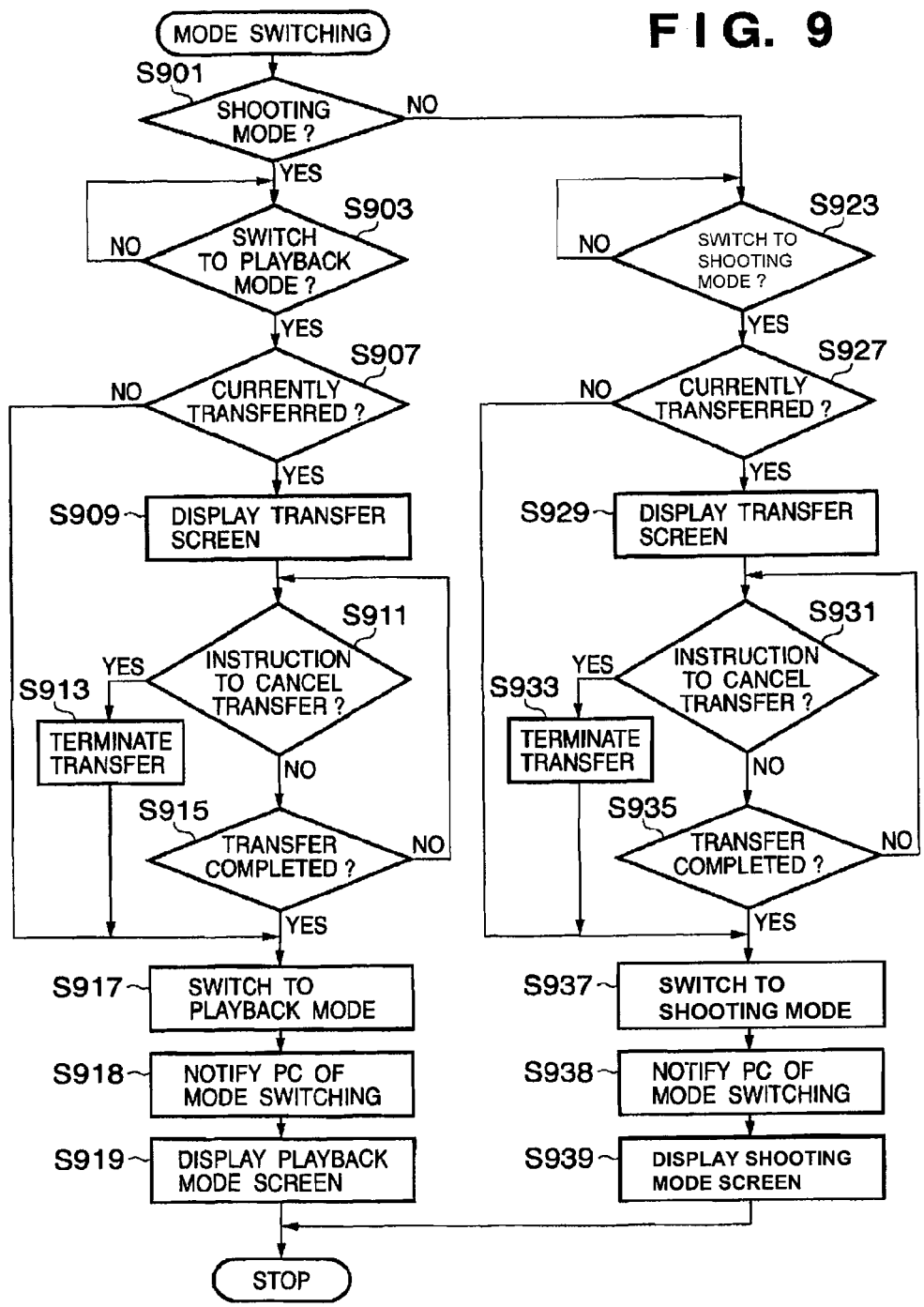
FIG. 9 is a flowchart for explaining switching of modes in the digital camera 200 according to the First Embodiment.

FIG. 9 is a flowchart for explaining switching of modes in the digital camera 200 of the present embodiment. FIG. 6 is a diagram showing a change of display in the digital camera 200 and the PC 220 when a switching instruction of operation modes is provided in the digital camera 200 during "record and transfer". Similarly FIG. 7 is a diagram showing a change of display in the digital camera 200 and the PC 220 when a switching instruction of operation modes is provided in the digital camera 200 during "playback image transfer".

Switching of modes will be described below with reference to these drawings.

First, in S901, processing is branched according to the current operation mode. In shooting mode, the process advances to S903. In playback mode, the process advances to S923.

When operating in shooting mode, the digital camera 200 waits for a switching instruction to playback mode in S903. A switching instruction of modes is provided, for example, when a mode switching lever or the like included in the operation unit 216 is switched from the position of shooting mode to the position of playback mode.

In FIG. 6, reference numeral 701 shows display screens 706 and 707 of the display unit 217 and the display unit 222. At this point, continuous shooting is performed with a setting for the "record and transfer" and the number of recorded images reaches the maximum number of recordable images. In this case, the buffer of the digital camera 200 is full of shot image data and thus no more images can be shot. Further, the transfer of shot images is started.

The display screen 706 on the digital camera 200 is a screen of shooting mode (normally electronic view finder display). The display screen 707 (GUI (graphical user interface) of the application 314) on the PC 220 is display provided at the start of transfer. When transfer has been underway, the most recently transferred image is displayed.

In this state, when a switching instruction to playback mode is inputted, the shooting manager module 304 detects the input. Then, in S907, the shooting manager module 304 inquires of the communication manager module 310 whether image data is currently transferred or not. The communication manager module 310 decides whether image data is currently transferred or not. In this case, image data is currently transferred and thus the process advances to S909 to request the playback manager module 303 to display a transfer screen 708. The transfer is still continued (may be temporarily stopped) at this point. Even when the mode switching lever is physically placed on playback mode, shooting mode is kept in the digital camera 200.

Meanwhile, the application 314 of the PC 220 displays a transfer screen 709 on which the most recently transferred images are sequentially displayed.

As shown in FIG. 6, the transfer screen 708 on the digital camera 200 includes a "cancel" button for notifying the user who has provided a switching instruction of modes that image data is currently transferred and the transfer can be cancelled.

In S911, the shooting manager module 304 confirms the presence or absence of an instruction to cancel the transfer through the operation unit 216. In the absence of an instruction to cancel the transfer process, it is confirmed in S915 whether the transfer process of the communication manager module 310 is completed or not. When no instruction to cancel the transfer process is provided and the transfer is not completed, the transfer process is continued. When the transfer process is interrupted in S909, a "transfer continuation button" may be added on the transfer screen to continue the transfer after input of an instruction to continue the transfer.

In S911, when an instruction to cancel the transfer process is detected, the shooting manager module 304 instructs the communication manager module 310 to terminate the transfer process (S913). The communication manager module 310 terminates the transfer process in response to the instruction.

When the transfer process is not underway in S907, the transfer process is completed in S915, or the transfer process is terminated in S913, the shooting manager module 304 switches internal operation mode to playback mode in S917. In other words, the control is shifted to the playback manager module 303. The playback manager module 303 causes the communication manager module 310 to notify the PC 220 of a change of the operation mode of the digital camera 200, for example, as a PTP event (S918). Then, the playback manager module 303 displays a playback mode screen 710 (S919) and then controls processing in playback mode.

The application 314 of the PC 220 prepares for "playback image transfer" when being notified that the operation mode of the digital camera 200 is switched, and changes the screen 709 to a transfer waiting screen 711 accordingly. Thus even when the application 314 of the PC 220 requires a change of processing contents according to the operation mode of the digital camera 200, correct handling can be achieved. However, in the present embodiment, the steps of the transfer process are shared in the "record and transfer" and the "playback image transfer" of the PC 220 as described above.

In the case of an operation in playback mode, processing is performed from S923.

When operating in playback mode, the digital camera 200 waits for a switching instruction to shooting mode in S923. A switching instruction of modes is provided, for example, when the mode switching lever or the like included in the operation unit 216 is switched from the position of playback mode to the position of shooting mode.

In FIG. 7, reference numeral 801 shows display screens 806 and 807 of the display unit 217 and the display unit 222. In this state, an instruction is provided to transfer all or selected images with a setting for the "playback image transfer". The transfer of shot images is started at this point.

The display screen 806 on the digital camera 200 is a screen of playback mode (normally the display of a selected image and the display of the transfer state of a progress bar or the like). The display screen 807 (GUI of the application 314) on the PC 220 is display provided at the start of transfer. When transfer has been underway, the most recently transferred image is displayed.

In this state, when a switching instruction to shooting mode is inputted, the playback manager module 303 detects the input. Then, in S927, the playback manager module 303 inquires of the communication manager module 310 whether image data is currently transferred or not. The communication manager module 310 decides whether image data is currently transferred or not. In this case, since image data is currently transferred, the process advances to S929 and the playback manager module 303 displays a transfer screen 808. The transfer process is still continued (may be temporarily stopped) at this point. Even when the mode switching lever is physically placed on shooting mode, playback mode is kept in the digital camera 200.

Meanwhile, the application 314 of the PC 220 displays a transfer screen 809 on which the most recently transferred images are sequentially displayed.

As shown in FIG. 7, the transfer screen 808 on the digital camera 200 includes a "cancel" button for notifying the user who has provided a switching instruction of modes that image data is currently transferred and the transfer can be cancelled.

In S931, the playback manager module 303 confirms the presence or absence of an instruction to cancel the transfer through the operation unit 216. In the absence of an instruction to cancel the transfer process, it is confirmed in S935 whether the transfer process of the communication manager module 310 is completed or not. When no instruction to cancel the transfer process is provided and the transfer is not completed, the transfer process is continued. When the transfer process is interrupted in S929, a "transfer continuation button" may be added on the transfer screen to continue transfer after input of an instruction to continue transfer.

In S931, when an instruction to cancel the transfer process is detected, the playback manager module 303 instructs the communication manager module 310 to terminate the transfer process (S933). The communication manager module 310 terminates the transfer process in response to the instruction.

When the transfer process is not underway in S927, the transfer process is completed in S935, the transfer process is terminated in S933, the playback manager module 303 switches internal operation mode to shooting mode in S937. In other words, the control is shifted to the shooting manager module 304. The shooting manager module 304 causes the communication manager module 310 to notify the PC 220 of a change of the operation mode of the digital camera 200, for example, as a PTP event (S938). Then, the shooting manager module 304 displays a shooting mode screen 810 (S939) and then controls processing in shooting mode.

The application 314 of the PC 220 prepares for "record and transfer" when being notified that the operation mode of the digital camera 200 is switched, and changes the screen 809 to a transfer waiting screen 811 accordingly. Thus even when the application 314 of the PC 220 requires a change of processing contents according to the operation mode of the digital camera 200, correct handling can be achieved. In the present embodiment, the steps of the transfer process are shared in the "record and transfer" and the "playback image transfer" of the PC 220 as described above.

When the digital camera 200 can continue the transfer process as it is (background transfer is possible) even after the operation mode is switched, the internal operation mode may be also switched at the switching instruction of the operation mode.

As described above, according to the digital camera 200 of the present embodiment, even when the operation mode is switched during the transfer process, the actual operation is switched after the completion of the transfer process. Thus even when an external device requires a change of processing contents according to the operation mode of the digital camera 200, correct handling can be achieved and the transfer process is not abnormally terminated. For this reason, even if the user carelessly switches modes during the image transfer process, the transfer process is normally performed. On the other hand, the transfer process can be cancelled, and thus even before the completion of the transfer process, it is possible to deal with a situation in which the operation modes should be switched, achieving excellent usability for the user.

Further, the transfer process is shared by the image transfer process in playback mode and the image transfer process in shooting mode. Thus an external device at the transfer destination does not have to change processing contents in response to switching of operation modes. Therefore the load of the external device is reduced.

Second Exemplary Embodiment

The following will describe Second Embodiment, a modification of the First Embodiment. The Second Embodiment is a modification of the First Embodiment and thus the explanation of the common parts is omitted. The common parts with the First Embodiment can achieve the same effect as the First Embodiment.

Figure 8:
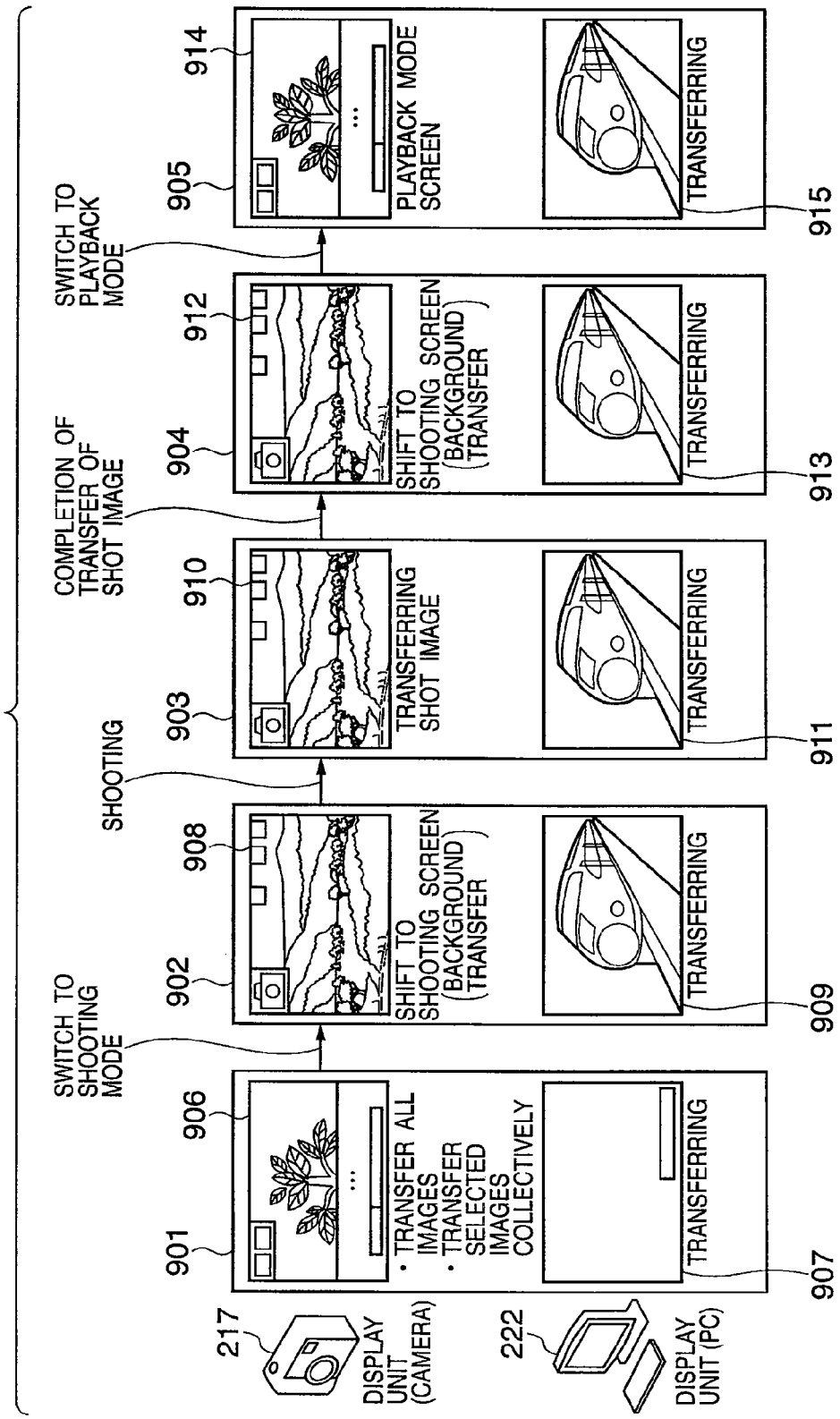
FIG. 8 is a diagram showing a change of display on a digital camera 200 and a PC 220 when a switching instruction of operation modes is provided in the digital camera 200 during "playback image transfer" according to the Second Embodiment.

FIG. 8 is a diagram showing a change of display in a digital camera 200 and a PC 220 when a switching instruction of operation modes is provided in the digital camera 200 during "playback image transfer" according to the Second Embodiment of the present invention.

The digital camera 200 of the present embodiment is different from the digital camera 200 of the First Embodiment in that background transfer is possible. Specifically, the "record and transfer" process of FIG. 4 and the "playback image transfer" process of FIG. 5 can be performed regardless of the operation mode of the camera, and both of the transfer processes can be broken into threads and performed in parallel in appearance.

In other words, when a switching instruction to a second operation mode is provided during an image transfer process in a first operation mode, the digital camera 200 of the present embodiment immediately switches the operation mode to the second operation mode. At this point, the digital camera 200 continues the image transfer process through background processing. Further, when a transfer process in the second operation mode occurs during background transfer, the two transfer processes are threaded and performed by background processing.

In FIG. 8, reference numeral 901 shows display screens 906 and 907 of the display unit 217 and the display unit 222. In this state, an instruction is provided to transfer all or selected images collectively with a setting for the "playback image transfer". The transfer of shot images is started at this point.

The display screen 906 on the digital camera 200 is a screen for the playback mode (normally the display of a selected image and the display of the transfer state, such as a progress bar). The display screen 907 (GUI of the application 314) on the PC 220 is display provided at the start of transfer. When transfer has been underway, the most recently transferred image is displayed.

In this state, when a switching instruction to shooting mode is inputted, the playback manager module 303 detects the input. Then, the playback manager module 303 switches internal operation mode to shooting mode while continuing the transfer process. Thus, the display screen on the digital camera 200 is switched to display screen 908 for the shooting mode (902 in FIG. 8). At this point, the "playback image transfer" process is continued by background processing and thus the display on the PC 220 remains a normal transfer screen 909.

During shooting, shooting process is performed by a shooting manager module 304 and the "record and transfer" process of FIG. 4 is performed. A transfer screen 910 of a shot image is displayed on the digital camera 200 (903 in FIG. 8).

During the "record and transfer" process, when the "playback image transfer" process is continued, both of the processes are performed in parallel by background processing. Therefore, a process of reading and transferring image data of a selected image stored in the storage medium 218 and a process of reading and transferring image data of a shot image stored in the RAM 210 are performed in different threads.

As in the First Embodiment, the transfer process is shared by the "record and transfer" and the "playback image transfer" in the digital camera 200 of the present embodiment. Thus the PC 220 only processes the reception of multiple pieces of image data in different threads. The transfer process is performed regardless of whether an image is a shot image or an image read from the storage medium 218. Therefore, the display screen remains a normal transfer screen 911 (although the same contents are shown in FIG. 8, actually read images are sequentially displayed).

At the completion of the transfer of shot images, the display on the digital camera 200 returns to a screen 912 for the shooting mode (the same as screen 908). Before the completion of the "playback image transfer" process, continuous processing is performed by background processing and a transfer screen 913 is kept on the PC 220.

Thereafter, in the presence of a switching instruction to playback mode, the operation mode of the digital camera 200 is immediately switched to playback mode and the display screen 912 is switched to display screen 914 for the playback mode. At this point, when the "playback image transfer" process is not still completed, continuous processing is performed by background processing and a transfer screen 915 is kept on the PC 220.

When the transfer process is completed at any point between reference numerals 904 and 905 in FIG. 8, the display screen on the PC 220 is switched to the display screen 811 of FIG. 7 and the PC 220 is placed in the transfer wait state.

As described above, also in the digital camera 200 of the present embodiment, the common transfer process is performed in the image transfer process of playback mode and the image transfer process of shooting mode. Thus an external device at the transfer destination does not have to change processing contents in response to switching of operation modes. Therefore, the load of the external device is reduced.

Moreover, according to the present embodiment, the image transfer process can be processed by background processing and thus the user can switch a mode to a desired operation mode at anytime without confirming whether an image is transferred or not. For this reason, usability is higher than that of the First Embodiment.

Another Exemplary Embodiment

The foregoing embodiments can be also implemented as software by the computer (or a CPU, an MPU or the like) of a system or an apparatus.

The present invention is thus implemented also by a computer program which is supplied or installed into the computer to implement the functional processing of the present invention. In other words, the computer program for implementing the functional processing of the present invention is also included in the present invention.

In this case, any program format is acceptable as long as program functions are available. An object code, a program implemented by an interpreter, script data supplied to an OS (operating system), and so on may be used.

In this case, the computer program for implementing the functional processing of the present invention in the computer is supplied to the computer through a storage medium or wired/wireless communications. The storage medium for supplying the program includes, for example, a flexible disk, a hard disk, a magnetic storage medium such as a magnetic tape, an optical/magneto-optical storage medium such as an MO, a CD, and a DVD, and nonvolatile semiconductor memory.

A method of supplying a program through wired/wireless communications includes a method using a server on a computer network. In this case, a data file (program data file) serving as a computer program forming the present invention is stored in the server. The program data file may be provided in execute form or source code.

Then, the program data file is supplied by downloading to a client computer having accessed the server. In this case, the program data file can be divided into two or more segment files and the segment files can be distributed to different servers.

In other words, the present invention also includes the server for providing the client computer with the program data file for implementing the functional processing of the present invention in the computer.

Further, a storage medium in which the computer program of the present invention is encrypted and stored may be distributed to the user, and the user who meets predetermined conditions may be provided with key information for decryption to enable the program to be installed in the computer of the user. The key information can be supplied by, for example, downloading from a website through the Internet.

Moreover, the computer program for implementing the functions of the embodiments through the computer may implement the functions of the embodiments by means of the functions of the OS which has operated on the computer.

Further, at least a part of the computer program included in the present invention may be provided as firmware of an expansion board or the like mounted in the computer, and the functions of the embodiments may be implemented using a CPU included in the expansion board or the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2005-263072, filed on Sep. 9, 2005, which is hereby incorporated by reference herein its entirety.

What is claimed is:

1. An image capture apparatus comprising:
a display unit coupled to a processor;
wherein the processor:
   (a) switches a first operation mode to a second operation mode so that the image capture apparatus can transfer second image data to an external device if a first switching instruction for switching the first operation mode to the second operation mode is inputted when the image capture apparatus is not transferring first image data to the external device;
   (b) causes the display unit to display first information for notifying a user that the first image data is currently transferred and second information for notifying a user that the transfer of the first image data can be cancelled, in response to the first switching instruction which is inputted when the image capture apparatus is transferring the first image data to the external device;
   (c) switches the second operation mode to the first operation mode so that the image capture apparatus can transfer fourth image data to the external device if a second switching instruction for switching the second operation mode to the first operation mode is inputted when the image capture apparatus is not transferring third image data to the external device; and
   (d) causes the display unit to display third information for notifying a user that the third image data is currently transferred and fourth information for notifying a user that the transfer of the third image data can be cancelled, in response to the second switching instruction which is inputted when the image capture apparatus is transferring the third image data to the external device.

2. The image capture apparatus according to claim 1, wherein the first image data corresponds to a first captured image, the second image data corresponds to a first reproduced image, the third image data corresponds to a second reproduced image, and the fourth image data corresponds to a second captured image.

3. The image capture apparatus according to claim 1, wherein the first operation mode corresponds to a shooting mode, and the second operation mode corresponds to a playback mode.

4. The image capture apparatus according to claim 1, wherein the processor avoids switching the first operation mode to the second operation mode until the first image data is transferred to the external device so that the image capture apparatus can continue the transfer of the first image data if the first switching instruction is inputted when the image capture apparatus is transferring the first image data to the external device.

5. The image capture apparatus according to claim 1, wherein the processor avoids switching the second operation mode to the first operation mode until the third image data is transferred to the external device so that the image capture apparatus can continue the transfer of the third image data if the second switching instruction is inputted when the image capture apparatus is transferring the third image data to the external device.

6. The image capture apparatus according to claim 1, wherein the processor provides the second image data to a communication unit coupled to the processor if the image capture apparatus transfers the second image data to the external device, and provides the fourth image data to the communication unit if the image capture apparatus transfers the fourth image data to the external device.

7. The image capture apparatus according to claim 6, wherein the communication unit is configured to transfer the second image data to the external device based on Picture Transfer Protocol (PTP), and is configured to transfer the fourth image data to the external device based on the PTP.

8. The image capture apparatus according to claim 6, wherein the communication unit is detachable from the image capture apparatus.

9. The image capture apparatus according to claim 6, wherein the communication unit is capable of acting as a wireless communication unit.

10. The image capture apparatus according to claim 1, wherein the image capture apparatus is capable of acting as a digital camera.

11. A method comprising:
causing a processor of an image capture apparatus to switch a first operation mode to a second operation mode so that the image capture apparatus can transfer second image data to an external device if a first switching instruction for switching the first operation mode to the second operation mode is inputted when the image capture apparatus is not transferring first image data to the external device;
causing a display unit, which is coupled to the processor, to display first information for notifying a user that the first image data is currently transferred and second information for notifying a user that the transfer of the first image data can be cancelled, in response to the first switching instruction which is inputted when the image capture apparatus is transferring the first image data to the external device;
causing the processor to switch the second operation mode to the first operation mode so that the image capture apparatus can transfer fourth image data to the external device if a second switching instruction for switching the second operation mode to the first operation mode is inputted when the image capture apparatus is not transferring third image data to the external device; and
causing the display unit to display third information for notifying a user that the third image data is currently transferred and fourth information for notifying a user that the transfer of the third image data can be cancelled, in response to the second switching instruction which is inputted when the image capture apparatus is transferring the third image data to the external device.

12. The method according to claim 11, wherein the first image data corresponds to a first captured image, the second image data corresponds to a first reproduced image, the third image data corresponds to a second reproduced image, and the fourth image data corresponds to a second captured image.

13. The method according to claim 11, wherein the first operation mode corresponds to a shooting mode, and the second operation mode corresponds to a playback mode.

14. The method according to claim 11, further comprising:
causing the processor to avoid switching the first operation mode to the second operation mode until the first image data is transferred to the external device so that the image capture apparatus can continue the transfer of the first image data if the first switching instruction is inputted when the image capture apparatus is transferring the first image data to the external device.

15. The method according to claim 11, further comprising:
causing the processor to avoid switching the second operation mode to the first operation mode until the third image data is transferred to the external device so that the image capture apparatus can continue the transfer of the third image data if the second switching instruction is inputted when the image capture apparatus is transferring the third image data to the external device.

16. The method according to claim 11, further comprising:
providing the second image data to a communication unit if the image capture apparatus transfers the second image data to the external device; and
providing the fourth image data to the communication unit if the image capture apparatus transfers the fourth image data to the external device.

17. The method according to claim 16, wherein the communication unit is configured to transfer the second image data to the external device based on Picture Transfer Protocol (PTP), and is configured to transfer the fourth image data to the external device based on the PTP.

18. The method according to claim 16, wherein the communication unit is detachable from the image capture apparatus.

19. The method according to claim 16, wherein the communication unit is capable of acting as a wireless communication unit.

20. The method according to claim 11, wherein the image capture apparatus is capable of acting as a digital camera.

21. The method according to claim 11, wherein the image capture apparatus includes the processor and the display unit.

22. A non-transitory computer-readable storage medium that stores a program for causing a computer to execute a method, the method comprising:
causing a processor of an image capture apparatus to switch a first operation mode to a second operation mode so that the image capture apparatus can transfer second image data to an external device if a first switching instruction for switching the first operation mode to the second operation mode is inputted when the image capture apparatus is not transferring first image data to the external device;
causing a display unit, which is coupled to the processor, to display first information for notifying a user that the first image data is currently transferred and second information for notifying a user that the transfer of the first image data can be cancelled, in response to the first switching instruction which is inputted when the image capture apparatus is transferring the first image data to the external device;
causing the processor to switch the second operation mode to the first operation mode so that the image capture apparatus can transfer fourth image data to the external device if a second switching instruction for switching the second operation mode to the first operation mode is inputted when the image capture apparatus is not transferring third image data to the external device; and
causing the display unit to display third information for notifying a user that the third image data is currently transferred and fourth information for notifying a user that the transfer of the third image data can be cancelled, in response to the second switching instruction which is inputted when the image capture apparatus is transferring the third image data to the external device.

* * * * *